United States Patent [19]

Hengen

[11] 4,156,338

[45] May 29, 1979

[54] ROCK GUARD FOR A ROW CROP HARVESTING MACHINE

[75] Inventor: Edward J. Hengen, Bettendorf, Iowa

[73] Assignee: Deere & Company, Moline, Ill.

[21] Appl. No.: 810,433

[22] Filed: Jun. 27, 1977

[51] Int. Cl.² .......................................... A01D 45/02
[52] U.S. Cl. ...................................... 56/106; 56/119
[58] Field of Search ................ 56/119, 94, 98, 106, 56/108, 14.1, 14.2

[56] References Cited

U.S. PATENT DOCUMENTS

| | | | |
|---|---|---|---|
| 1,800,058 | 4/1931 | Dugger | 56/119 |
| 2,731,780 | 1/1956 | Witt | 56/119 |
| 3,813,858 | 6/1974 | McDermott | 56/119 |
| 3,982,384 | 9/1976 | Rohweder et al. | 56/106 |

*Primary Examiner*—Russell R. Kinsey

[57] ABSTRACT

A row crop harvesting header has a main frame with a plurality of forwardly extending, independently vertically adjustable row units mounted on the frame, each row unit including a frame attached to the header frame at its rearward end and a ground engaging skid at its forward end. A pair of endless flexible conveyors are mounted on the row unit frame and have opposite, rearwardly moving, upwardly and rearwardly inclined inner runs adapted to engage the stalks of row planted crops as the machine advances and convey it rearwardly, a cutting apparatus below the forward inlet ends of the belts severing the crop material from the field as it is engaged by the conveyor. The row unit frame includes a pair of forwardly diverging members extending forwardly of the front of the conveyors to form a crop receiving throat in front of the inlet to the conveyors, and a pair of rock deflectors are attached to the opposite frame elements and include a plurality of generally fore and aft fingers disposed in the throat area, the opposite sets of fingers being laterally spaced to provide a fore and aft passage that is wide enough to permit the passage of the crop material to the conveyors but deflects larger rocks and foreign objects downwardly or causes the row unit to ride up over said objects to prevent damage to the cutting apparatus or ingestion of the objects into the conveyors.

7 Claims, 3 Drawing Figures

ROCK GUARD FOR A ROW CROP HARVESTING MACHINE

BACKGROUND OF THE INVENTION

This invention relates to a row crop harvesting header for a combine, a forage harvester, or the like, wherein the header removes row planted crops from the field as the machine advances and delivers it rearwardly to the harvesting machine for further processing. Such a row crop harvesting header is shown in U.S. Pat. No. 3,982,384, which is also assigned to the assignee herein. As described in said U.S. patent, the header includes a plurality of row units that extend forwardly from the main header frame, each row unit being adapted to remove one row of row planted crop material. Each row unit includes a pair of laterally spaced endless flexible conveyors having opposite rearwardly moving inner runs that grasp the crop material to deliver it rearwardly to a further conveying system on the header, a cutting apparatus being provided at the forward end of the conveyors to sever the crop from the field.

When the machine is being used to harvest soybeans or the like, it is desirable to sever the crop as close to the ground as possible and therefore the machine is operated with the forward end of each row unit riding along the ground on the skids at the front of the row unit frame. While some fields are relatively clean, in certain areas, there are numerous rocks lying in the field, while in other fields there are foreign objects such as bricks or tree branches, and when the row units are operated close to the ground, the rocks and foreign objects can damage the cutting apparatus, or in some cases can be engaged by the conveyors, which can be damaged thereby. Also, the conveyors could deliver the foreign object into the harvesting machine, which can cause additional damage.

SUMMARY OF THE INVENTION

According to the present invention, a rock guard or rock deflector structure is provided for the row unit for such a row crop harvesting machine to prevent larger rocks and foreign objects from being ingested into the row unit conveyors or being engaged by the cutting apparatus. More specifically, a deflector structure is provided in the throat area immediately in advance of the forward ends of the conveyors and the cutting apparatus to deflect rocks or foreign objects larger than a certain size downwardly and forwardly upon engagement by the deflector structure or alternately in the event that the rock or foreign object is immobile, causing the row unit to raise and ride over the rock or foreign object.

An important feature of the invention resides in the simple and rugged structure of the rock deflectors, which can be provided as original equipment or easily added to machine already in the field.

Also, according to the invention, the rock deflecting structure is in the form of a pair of deflectors respectively mounted on the row unit frame in advance of the conveyors, each deflector including a plurality of fore and aft fingers that are spaced from the fingers of the opposite deflector a sufficient distance to permit the passage of the stalks of crop material to be harvested while restricting the throat area in advance of the conveyors to reject rocks or foreign material that would be of sufficient size to damage the conveyors. Still another feature of the invention resides in the provision of such fingers wherein the opposite sets of fingers converge rearwardly, with the upper fingers converging rearwardly at a faster rate than the lower, so that the overall deflector structure converges both rearwardly and upwardly, whereby the row unit would tend to ride over a rock or the like.

DESCRIPTION OF THE PREFERRED EMBODIMENT

Figure 1:
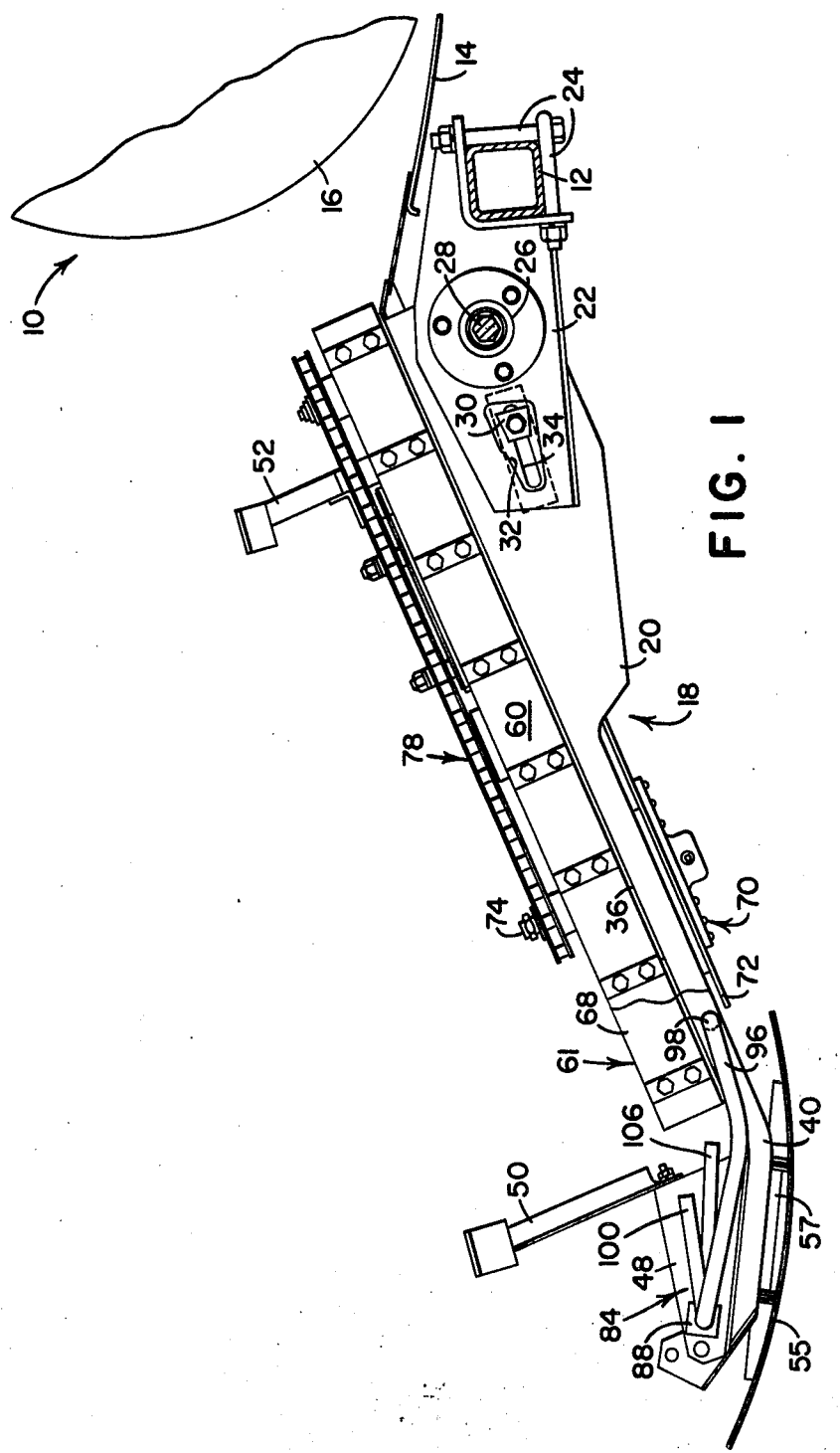
FIG. 1 is a side elevation view of a row unit mounted on the header frame, only the forward portion of the header being shown, with portions of the row unit being removed to more clearly show the invention.
Figure 3:
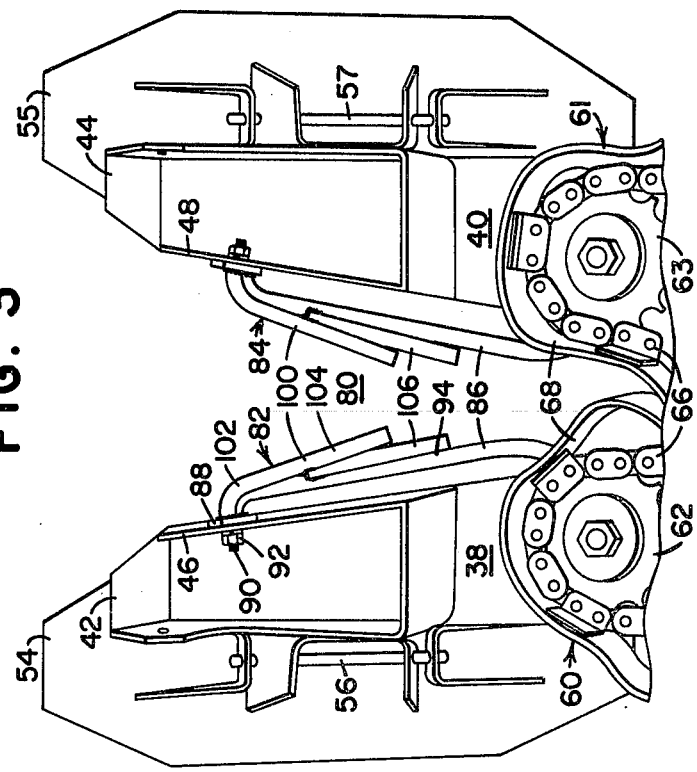
FIG. 3 is a top perspective view of the forward end of the row unit having the rock guard mounted thereon.
Figure 2:
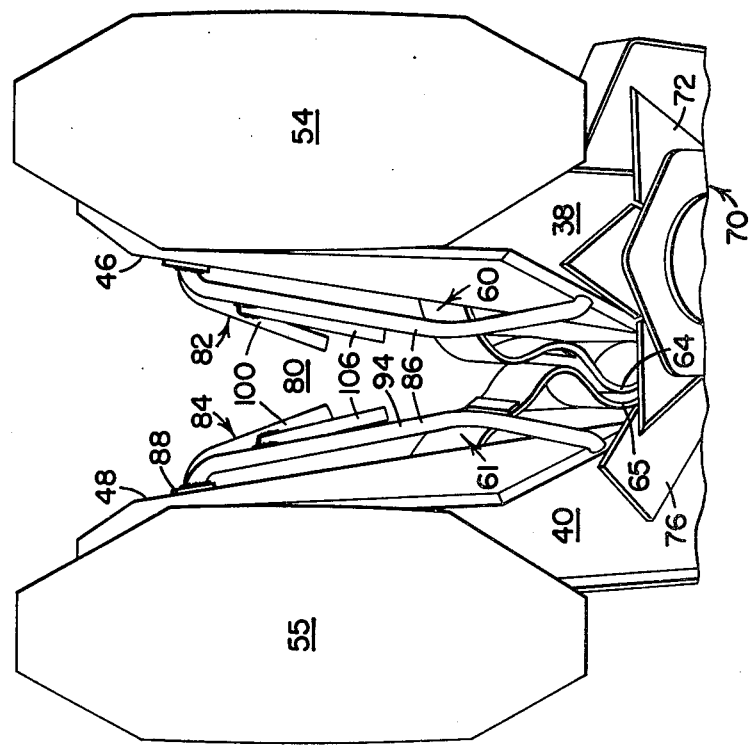
FIG. 2 is a bottom perspective view of a forward end of a row unit showing the rock guard mounted thereon.

The invention is embodied in a row crop header, indicated generally by the numeral 10, only the forward portion of the header being shown in the drawings. The overall construction of the header and its mounting on a self-propelled combine is shown in greater detail in U.S. Pat. No. 3,982,384, which is also assigned to the assignee herein. The header 10 includes a transversely elongated main frame that includes a transverse beam 12 extending the width of the header underneath the forward end of a generally horizontal floor 14. A transverse crop converging auger 16 is disposed immediately above the floor 14 and converges the crop delivered to the floor to the center of the header for discharge to the combine, only the forward portion of the floor and the auger being shown in FIG. 1.

Mounted on the header are a plurality of forwardly extending row units 18, only a single row unit being disclosed herein since the units are essentially identical and are described in greater detail in the above U.S. Patent, each row unit being adapted to remove a separate row of row planted crop material from the field as the machine advances and deliver the crop material to the header auger 16. Each row unit includes a generally fore and aft downwardly and forwardly inclined frame 20 having its rearward end attached to the header beam 12 by a pair of mounting brackets 22 at opposite sides of the row unit frame 20, each mounting bracket 22 being removably and adjustably mounted on the beam 12 by means of mounting bolts 24. The row unit frame 20 is swingably mounted on the mounting brackets 22 by means of annular transversely aligned pivots 26, so that the row unit frame is vertically adjustable about the axis of the pivots 26. A transverse drive shaft 28 extends through the annular pivots 26 and spans the width of the header and supplies the power input of the driven components on the row units.

The vertical adjustment of the row units about the pivots 26 is limited by a block type stop 30 that is disposed in an opening 32 in the mounting bracket 22, the upward and downward movement of the row unit being limited by engagement of the stop 30 with the upper or lower edges of the opening 32. The stop 30 is adjustable in a fore and aft direction along a slot 34, and when the stop is in its rearward position, as shown in FIG. 1, there is a gap between the stop and the edges of the opening to permit the vertical adjustment. However, when the stop is adjusted forwardly along the slot, where the opening 22 is narrower in a vertical dimension, the stop seats snugly against the top and bottom of the opening to lock the row unit rigidly with the main header frame.

The row unit frame includes a plate-like upwardly and rearwardly inclined frame member 36, that extends substantially the length of the frame, and a pair of forwardly diverging frame arms or forward frame elements 38 and 40 that extend forwardly from the plate-like frame member. Respectively mounted on the frame arms 38 and 40 are a pair of upright support members 42 and 44 respectively. The support members 42 and 44 have a generally rectangular shape with upright side walls and open tops, the opposite support members 42 and 44 respectively including opposite upright inner walls 46 and 48 that converge rearwardly at the same angle as the arms 38 and 40, the walls 46 and 48 being aligned with and extending upwardly from the inner edges of the arms 38 and 40.

Front and rear hood supports 50 and 52 respectively extend upwardly from the support members and the row unit frame and provide support for the sheet metal hoods, which are not shown, the hood construction also being shown in detail in the above U.S. Patent. A pair of forward skids 54 and 55 are respectively pivotally connected to the support members 42 and 44 by means of pivot structures 56 and 57, the pivot structures providing articulation about both a fore and aft axis and a transverse axis to allow the skids to follow the contour of the ground. In normal operation, when harvesting soybeans or the like, the stop 30 is positioned as shown in FIG. 1 and the header is lowered so that the skids 54 ride along the ground on opposite sides of the row to be harvested, whereby that the forward end of the row unit closely follows the contour of the ground.

Mounted on top of the plate-like frame member 36 are a pair of endless flexible conveyors 60 and 61. The conveyors 60 and 61 are respectively trained around a pair of front sprockets 62 and 63, that are respectively mounted at the rearward ends of the frame arms 38 and 40, and are also trained around a pair of rear sprockets (not shown), so that the conveyors respectively have opposite inner runs 64 and 65 that are inclined upwardly and rearwardly immediately above the plate-like frame member 36. The conveyors are driven by the rear sprockets so that the inner runs 64 and 65 move rearwardly, and each conveyor includes a chain 66 that is trained around the sprockets and a sinuous flexible belt 68 that is attached to the chain at intervals and forms flexible loops between the points of attachment with the chain, since the length of the belt between the points of attachment is greater than the length of the chain. The opposite conveyors 60 and 61 are timed so that the loops in the inner runs closely intermesh to grasp the stalks of crop material that moves into the bite of the conveyors between the forward ends of the conveyors. Mounted on the under side of the plate-like frame member 36 adjacent the forward end thereof is a cutting apparatus 70 that includes a rotary knife 72 having a shaft 74 that extends upwardly through the plate and above the left hand conveyor. The rotary knife 72 registers with a stationary knife 76, that is disposed at the forward end of the plate-like frame member 36 and extends between the rearward ends of the frame arms 38 and 40. The rotary knife 72 is driven by a chain drive 78 above the conveyor, the drive 78 being driven by the drive shaft 28 through the rear conveyor sprocket. All of the above represents more or less known construction, and is described in greater detail in U.S. Pat. No. 3,982,384.

As the machine advances, the row of crop material enters into a throat area 80 that is defined by the inner edges of the frame arms 38 and 40 and the inner walls 46 and 48 of the opposite support members, the throat area terminating at the bite between the conveyors 60 and 61, which is immediately above the cutting apparatus 70 that defines the rearward end of the throat area 80. The crop material moving through the throat area is engaged at the forward ends of the conveyors 60 and 61 and immediately severed by the cutting apparatus after it is engaged, the severed crop material being held between the inner runs of the conveyors and moved rearwardly to the rearward end of the row unit where it is discharged onto the header floor 14.

Mounted in the throat area 80 is a rock deflector structure that is formed by a pair of rock deflectors 82 and 84, which are respectively attached to the inner walls 46 and 48 of the support members 42 and 44. The rock deflectors 82 and 84 essentially narrow the throat area in advance of the conveyors and the cutting apparatus to prevent certain rocks and foreign materials from being engaged by the conveyors and the cutting apparatus. In the illustrated embodiment, the gap between the crop deflectors 82 and 84 at the narrowest point is approximately two inches to prevent the entry of rocks larger than about two inches into the belts.

The rock deflectors 82 and 84 are identical except that they are mirror images of one another, and each deflector includes a generally fore and aft lower finger 86 that has its forward end welded to a bracket 88. The finger 86 is made of relatively rigid steel rod, and the bracket 88 includes a transversely extending threaded member 90 that extends through a laterally extending hole adjacent the forward end of the inner wall of the support member, the threaded member being locked to the support member by a nut 92, whereby the bracket and the rock deflector attached thereto can be easily mounted on or removed from the support member. The lower finger 86 includes a rearwardly and inwardly inclined forward portion 94 and a rearwardly and outwardly inclined rear portion 96, that terminates in a hooked rearward end 98 that extends transversely through a bore in the frame arm immediately in advance of the stationary knife 76. Thus, to install the deflector, the rearward hooked end 98 is first inserted into the appropriate bore in the frame arm and the threaded member 90 is then inserted through the hole in the support member inner wall and locked thereto by the nut 92.

Each rock deflector also includes a generally fore and aft upper finger 100, that is made of the same material as the lower finger 86 and also has its forward end 102 welded to the bracket 88. The upper finger 100 also includes an inclined portion 104 that is inclined inwardly at a greater angle than the inclined portion 94 of the lower finger, the upper finger 100 terminating in a free rearward end. Each rock deflector also include a middle finger 106, that is welded between the upper and lower fingers 86 and 100 and is inclined rearwardly and inwardly at a greater angle than the lower finger but a lesser angle than the upper finger, the middle finger 106 also terminating in a free rearward end. As best seen in FIG. 1, the forward ends of the fingers are all disposed at the same level, while the inclined portions extend rearwardly at different angles to the horizontal. Thus, the passage between the opposite rock deflectors 82 and 84 converges rearwardly and also converges upwardly.

In operation, as previously described, the machine is advanced with the skids of the respective row units, straddling rows of crop material to be harvested, the crop material moving into the throat area 90 of each row unit. The clearance between the opposite rock deflectors 82 and 84 of each row unit is sufficient to permit the rearward passage of the stalks of the crop in the row, which moves into the bite between the forward ends of the conveyors 60 and 61 and is engaged between the belt loops in the inner runs of the conveyors, after which it is severed from the field by the cutting apparatus 70. Since the rock deflectors in effect narrow the throat area 80 to approximately two inches, the deflectors prevent entry of rocks larger than about two inches into the belts, the larger rocks or other foreign objects being deflected forwardly and downwardly. The engagement of such objects by the rock deflectors also tends to make the row unit raise to clear the object, the downward divergence of the opposite deflectors and the rearward convergence assisting the upward movement of the forward end of the row unit.

Since the deflectors are formed by fingers, the crop material can be more readily compressed into a mat that will pass between the crop deflectors than if solid sheets were utilized, and since the rearward ends of the upper and intermediate fingers are free, the crop material will readily strip therefrom to avoid plugging of the throat area. The lower fingers, which extend further to the rear than the other fingers to the area immediately in front of the rotary knife to protect the rotary knife, are positively stripped by the conveyors, to further avoid plugging of the throat area.

I claim:

1. In a row crop harvesting machine having a mobile main frame adapted to advance over a field of row planted crops and at least one row crop harvesting unit mounted on the main frame and including a row unit frame, means for supporting the forward end of the row unit frame close to the ground, a pair of laterally spaced conveyor means mounted on the row unit frame and having opposite generally rearwardly moving inner runs adapted to engage crop material therebetween at the forward ends of the inner runs as the machine advances and move the crop material rearwardly, a cutting means mounted on the row unit frame close to the ground and generally below the forward ends of the inner runs for severing crop material from the field as it is engaged by the conveyor means, and a pair of transversely spaced frame elements attached to the row unit frame and respectively extending forwardly of the forward ends of the conveyor means to form a crop receiving throat area in advance of the cutting means, the improvement comprising: a pair of relatively rigid, generally fore and aft, transversely spaced rock deflector members disposed in the throat area forwardly of and at the same general level as the cutting means and generally below the forward ends of the conveyor means, said rock deflector members converging rearwardly and upwardly so that engagement of the fore and aft rock deflector members with a foreign object in the throat area as the machine advances tends to raise the row unit until it clears the object, said rock deflector members deflecting ground supported rocks and foreign material disposed in the throat area downwardly below the forward ends of the conveyor means and the cutting means; and connecting means respectively rigidly mounting said rock deflector members to the forward portions of the respective frame elements forwardly of the forward ends of the conveyor means and the cutting apparatus.

2. The invention defined in claim 1 wherein each fore and aft member includes a lower, generally fore and aft finger element, having a rearward end disposed adjacent to the cutting means, and an upper generally fore and aft finger element disposed above the lower finger element.

3. The invention defined in claim 2 wherein the rearward ends of the lower finger elements are connected to the respective frame elements and the rearward ends of the upper elements are free.

4. The invention defined in claim 3 wherein each fore and aft member includes an intermediate, generally fore and aft finger element disposed between the upper and lower elements, the forward ends of the lower, intermediate and upper elements of the respective fore and aft members being in general vertical alignment, the upper elements converging rearwardly at a greater rate than the intermediate elements and the intermediate elements converging rearwardly at a greater rate than the lower elements so that the opposite fore and aft members formed by said finger elements converges upwardly as well as rearwardly to further force the row unit upwardly to ride over foreign material engaged by said members.

5. The invention defined in claim 4 wherein the means connecting the fore and aft members to the respective frame elements comprises bracket means interconnecting the forward ends of said finger elements and fastener means connecting the forward end of at least one of said finger elements to the frame element.

6. The invention defined in claim 1 wherein each fore and aft member is formed by a plurality of generally fore and aft vertically spaced finger elements having their forward ends connected to the frame element by said connecting means.

7. The invention defined in claim 6 wherein at least one of the finger elements in each fore and aft element has its rearward end connected to the frame member adjacent to the forward side of the cutting means at generally the same level thereof.

* * * * *